(12) United States Patent
Godin

(10) Patent No.: US 7,900,233 B1
(45) Date of Patent: Mar. 1, 2011

(54) PROCESS AND SYSTEM FOR DISPLAYING VIDEO PROGRAMS ON DEMAND

(75) Inventor: Thierry Godin, Paris (FR)

(73) Assignee: OpenTV, Inc., San Francisco, CA (US)

( * ) Notice: Subject to any disclaimer, the term of this patent is extended or adjusted under 35 U.S.C. 154(b) by 0 days.

(21) Appl. No.: 10/181,404

(22) PCT Filed: Jan. 18, 2000

(86) PCT No.: PCT/IB00/00112
§ 371 (c)(1),
(2), (4) Date: Feb. 28, 2003

(87) PCT Pub. No.: WO01/54407
PCT Pub. Date: Jul. 26, 2001

(51) Int. Cl.
*H04N 7/173* (2006.01)
*H04N 17/00* (2006.01)

(52) U.S. Cl. .................. 725/101; 725/103; 348/180

(58) Field of Classification Search ......... 725/101–104, 725/58, 86–88; 348/180
See application file for complete search history.

(56) References Cited

U.S. PATENT DOCUMENTS

| | | | |
|---|---|---|---|
| 5,357,276 A | 10/1994 | Banker et al. | |
| 5,594,491 A * | 1/1997 | Hodge et al. | 725/103 |
| 5,884,141 A * | 3/1999 | Inoue et al. | 725/101 |
| 6,308,007 B1 | 10/2001 | Iwasaki | |
| 6,473,902 B1 | 10/2002 | Noritomi | |
| 6,502,139 B1 | 12/2002 | Birk et al. | |
| 2002/0157103 A1 * | 10/2002 | Song et al. | 725/97 |
| 2005/0183127 A1 * | 8/2005 | Ngo et al. | 725/90 |

FOREIGN PATENT DOCUMENTS

| | | |
|---|---|---|
| JP | 8-287593 | 11/1966 |
| JP | 7-193788 | 7/1995 |
| JP | 9-149402 | 6/1997 |

OTHER PUBLICATIONS

Japanese Official Action Letter mailed May 24, 2005 for Japanese Patent Application No. 2001-553298 (English Translation Provided).

* cited by examiner

*Primary Examiner* — Hoang-Vu A Nguyen-Ba
(74) *Attorney, Agent, or Firm* — Rory D. Rankin; Meyertons, Hood, Kivlin, Kowert & Goetzel, P.C.

(57) ABSTRACT

The invention concerns a process and a system for displaying on demand video programs from broadcast NVOD programs. The process comprises the steps of recording in advance a beginning sequence of each NVOD programs from said network system, during a period of time at least equal to the corresponding time period of periodicity; selecting a NVOD program from a menu; while displaying the beginning sequence of the selected program, recording the following sequence of said selected NVOD program so that said following sequence of said selected program gets stored before the user reaches it, displaying said new sequence in continuation or partial overlap of said beginning sequence of the selected program, and recording and then displaying similarly following new sequences of said selected program until disconnection or the end of said selected program.

15 Claims, 3 Drawing Sheets

PROCESS AND SYSTEM FOR DISPLAYING VIDEO PROGRAMS ON DEMAND

The invention is related to a process for displaying video programs on demand, and the corresponding system.

It is more particularly but not exclusively related to the service of supporting real video on demand on top of broadcast networks.

Until now, broadcast networks cannot afford real video on demand because of bandwidth limitations.

That is why video on demand services are only mainly provided in hotels or other places having internal wide band networks.

With such systems, it is then possible to broadcast immediately a new video sequence over the network at the viewer request.

Otherwise, it can only be proposed a new video from time to time, for instance every hour or half an hour for a movie.

Such services are known in the prior art as Near Video On Demand (NVOD) services, which involve at least a periodicity for fresh starts of several minutes.

It is therefore a main object of the present invention to provide an improved process and system for supporting real video on demand, or Near Video on Demand with very short periodicity, i.e. no more than a few seconds, without consuming more network band width than the NVOD of the prior art, while using already existing NVOD broadcasts, and insuring compatibility with existing NVOD services.

Another object of the invention is to provide an improved process and system which allows combination with extra features such as low power mode (power saving), double tuner, or video cassette recorder (VCR) possibilities such as pause, backward, fast backward, fast forward, etc.

Still another object of the invention is to provide a system easily adapted to conditional access. For instance, Pay Per View systems, such as systems involving pay per time, pay per sequence (pay for each display of a video sequence) or pay per video event (pay only once for any number of displays) can easily and readily be implemented with the invention.

It is another object of the invention to provide a simple and cost saving system for Video on Demand programs.

Another object of the invention is to allow music on demand.

It is another object of the invention to provide an improved system which can afford to display programs carrying interactivity.

For these purpose, the present invention mainly proposes a process for displaying video programs on demand at the request of a user in a network system, characterised in that said network system providing NVOD programs, each of said NVOD programs being started with a respective predetermined periodicity, said process comprises the steps of:

recording in advance a beginning sequence of each NVOD program from said network system, during a period of time at least equal to the corresponding time period of periodicity, selecting a NVOD program from a menu, while displaying the beginning sequence of the selected program, recording the following sequence of said selected program from the NVOD network so that said following sequence of said selected program gets stored before the user reaches it, displaying said new sequence in continuation or partial overlap of said beginning sequence of the selected program, and recording and then displaying similarly following new sequences of said selected program until disconnection or the end of said selected program.

By sequence, one should understand a phase or a portion of a video program.

Advantageously, the period of time is a few minutes longer than the time period of periodicity of successive starts of the related program.

This allows the user to step backward in the video program within the period of time corresponding to these few minutes. For example, it could be 5 or 10 minutes.

In an advantageous embodiment NVOD programs are television broadcast programs.

Advantageously the process is characterised in that it comprises the steps of:

starting on t0 a preliminary recording of a NVOD program, in a TV receiver, in synchronisation with the start of the broadcasting of said NVOD program, ending said preliminary recording on t2 after the start on t1 of the following broadcast NVOD program, said obtained preliminary recorded program being the beginning sequence, selecting said NVOD program and starting displaying the beginning sequence on t4, said starting being delayed with regard to the start on t3 of the is currently running NVOD program by a period of time t4-t3 termed Playback Lag, starting recording on t5 the currently running NVOD program, said recording being termed Just-In-Time Recorded Video, switching from said beginning sequence to said Just-In-Time Recorded Video, on t9, within a time period comprised between t5+[Playback lag] and t4+t2−t0, displaying said Just-In-Time Recorded Video while continuing the recording of the currently running NVOD program, ending said recording upon the occurrence of the end of said Just-In-Time recorded video or disconnection by the user, and, ending said displaying upon the occurrence of said end of said Just-In-Time Recorded Video or of said disconnection by the user.

Advantageously the process is implemented in a DVB environment.

In an advantageous embodiment, the currently running NVOD program is recorded in a sliding window. By sliding window, it is meant circular files or circulating or shift registers.

In another embodiment, the recording of the currently running NVOD is provided in successive registers.

For instance, the NVOD program is recorded during a determined period of time t9-t5, said recording being termed First Just-In-Time Recorded Video sequence, the switching from the beginning period to said First Just-In-Time Video sequence is then provided, on t9, and while said First Just-In-Time Recorded Video sequence is displayed, a new sequence termed Second Just-In-Time Recorded Video sequence following said First Just-In-Time Recorded Video, is recorded during a time period t12-t9.

The switching to said second Just-In-Time Recorded Video sequence is then provided, while erasing said First Just-In-Time Recorded Video sequence, and said Second Just-In-Time Recorded Video sequence is displayed.

It is then proceeded accordingly for any following Just-In-Time Recorded Video sequences, while erasing the preceding one and until the end of the NVOD broadcast.

The invention also proposes a digital network system for displaying video programs on demand at the request of a user, including at least one digital Interactive Decoder, said system providing NVOD programs, each of said NVOD programs being started with a respective predetermined periodicity, to be received by said Decoder, wherein the System comprises:

(i) recording means for recording in advance a beginning sequence of each NVOD programs from said network system, during a period of time at least equal to the corresponding time period of periodicity, (ii) selecting means for selecting a program from a menu, (iii) displaying means for displaying the beginning sequence of the selected program, (iv) recording means for recording the following sequences of said selected program from the NVOD network so that at least one new sequence of said selected program gets stored before a user reaches it, and (v) displaying means for displaying said new sequence or new sequences in continuation or partial overlap of said beginning sequence or following portions of the selected program, until disconnection or the end of said selected program.

Advantageously the recording means comprise an hard drive and/or the NVOD programs are television broadcast programs, and/or the system is implemented in a DVB environment, and/or the Decoder comprises a built-in application for implementing interactivity programs with NVOD programs (then arranged to play with a delay).

The invention will be better understood from reading the following description of a particular embodiment given by way of non limiting example, and which refers to the accompanying drawings in which:

FIG. 1 is a time diagram 1 showing the process according to an embodiment of the invention involving one NVOD program 2 broadcast in multiplex.

Figure 1:
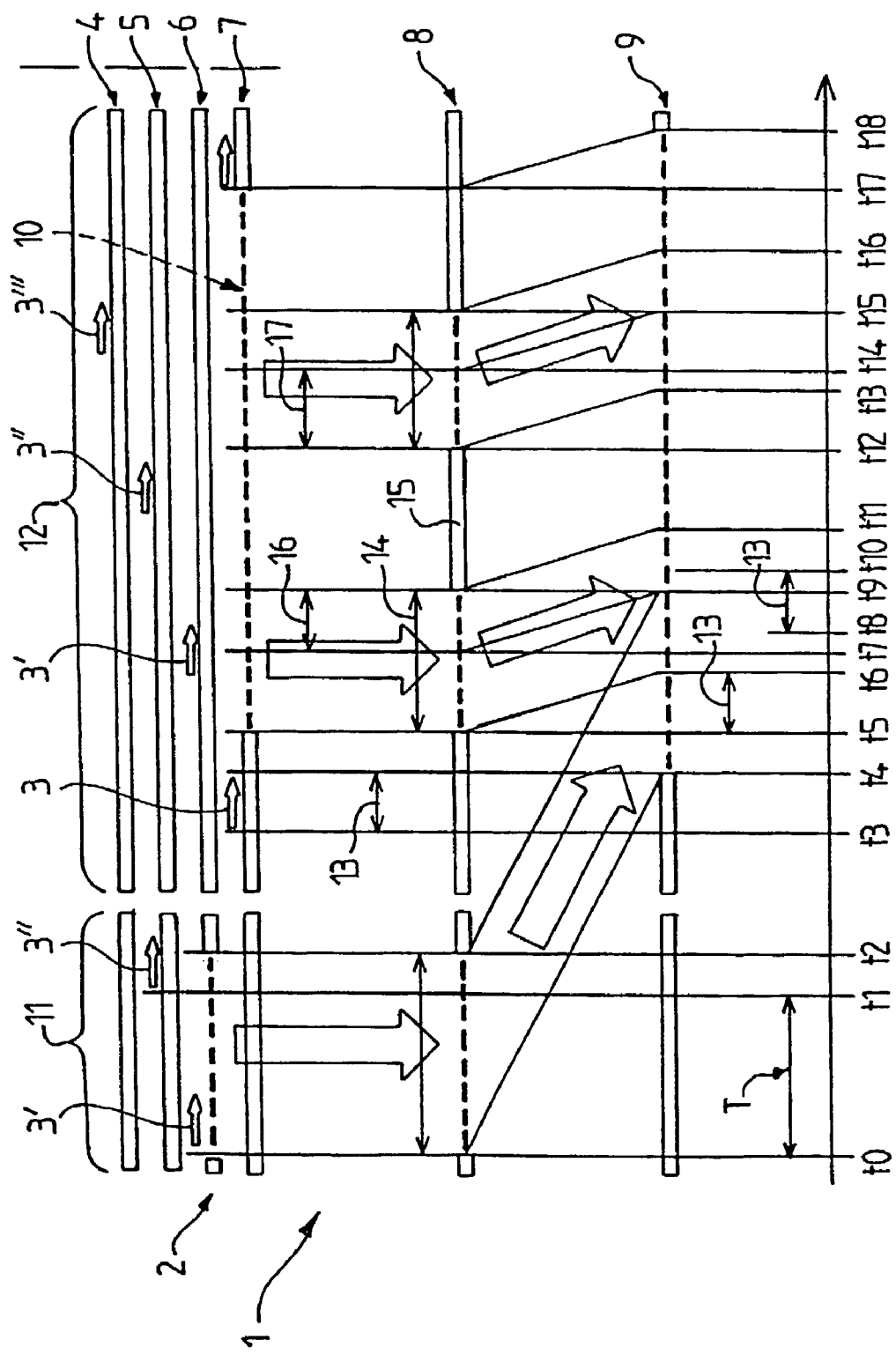
FIG. 1 is a time diagram of the process according to an embodiment of the invention.

Arrows referenced 3, 3', . . . show the successive periodic starts of said video program 2 or sequence in a Near Video On Demand broadcast provided by a radio television, using multiplexed channels 4, 5, 6, 7.

A periodicity of four starts (3, 3', 3" et 3''') of video sequences per relevant period is provided in the present example.

Line 8 on the diagram represents the state of the hard drive on which the video program is recorded in advance or just in time.

Line 9 concerns the display on the TV screen for the viewer.

According to the invention, when a NVOD program (video sequence) is provided for the first time (arrow 3'), it is immediately recorded on the hard disk during a period of time at least equal and for instance superior by 10% of the time period existing between consecutive broadcasts of a video sequence 3, 3', 3", 3''', etc.

For this purpose, and in a manner known per se, the recording is provided when the receiver/decoder of a TV Set receives for the first time a specific information (e.g. information indicating the start of a specific television program) for instance transmitted in one of the DVB tables of a broadcast signal. Comparison means are used.

The NVOD program is broadcast on the multiplexed channels according to the predetermined periodicity.

It is also represented on line 8 (the hard drive), the sequences 10 of video recorded just in time, for instance in a sliding window such as a circular file, to minimise the storage occupation.

FIG. 1 will now be more specifically explained in view of the time, as mentioned hereafter.

t0 Start of a preliminary recording 11 of the beginning of a NVOD program, in synchronous way with the start of said broadcast NVOD.

t1 Start of next broadcast (same NVOD program on a different channel) defining the time period T of periodicity (t1−t0).

t2 End of preliminary recording of the beginning of said NVOD program which must follow t1. It gets delayed for obtaining a larger backward window, i.e. T≦t2−t0.

t3 Last started broadcast before viewer starts watching the NVOD program during a period 12 of Just-In-Time recording and playing.

t4 Viewer starts for the video. Difference with t3 is referred as initial Playback Lag 13 (t4−t3).

t5 Receiver starts recording the last started broadcast, must precede t8.

t6 Start limit for switching Playback to Just-In-Time Recorded Video=(t5+Playback Lag).

t7 Entry point in Just-In-Time Recorded Video=(t9−Playback Lag).

t8 Time limit for starting to record last started broadcast= (t10−Playback Lag).

t9 Switch of Playback to Just-In-Time Recorded Video 15, must precede t10 and follow t6.

t10 Time limit for switching Playback to Just-In-Time Recorded Video=(t4+t2−t0)

t11 Playback time of t9 recorded video=(t9+Playback Lag) =(t9+size of forward window 16).

t12 Tail of t15 backward window, recorded in t12, played in t13 and erased in t15.

t13 Display time of t12 recorded video=(t12+Playback Lag).

t14 Record time of t15 displayed video=(t15−Playback Lag).

t15 Head of t15 Just-In-Time Recorded Video. Displays t14 recorded video.

Playback time of t15 recorded video=(t15+Playback Lag) =(t15+size of forward window).

End of Just-In-Time Recorded sequence (on broadcast).

End of video sequence playback.

Figure 2:
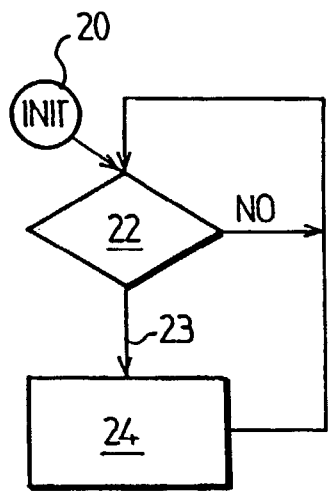
FIGS. 2, 3 and 4 are diagrams detailing specific procedures, respectively preliminary recording, preliminary record erasing and Just in Time recording and playing procedures, used in one embodiment of the invention.
Figure 3:
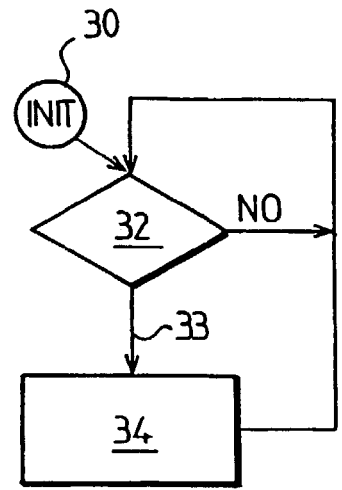
Figure 4:
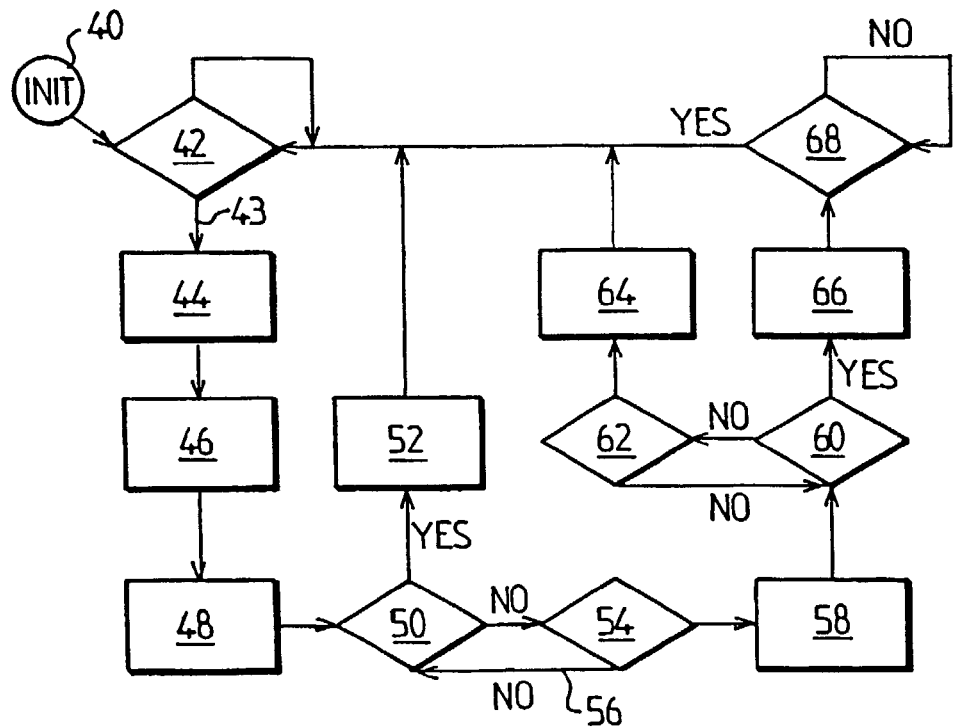

The main steps of the process according to the embodiment of the invention more particularly described here are now detailed in reference to FIGS. 2, 3 and 4.

FIG. 2 shows the preliminary recording operation 11, of the program.

The program is initiated in 20 upon turning on of the decoder/receiver connected to the Television apparatus of the user.

A test 22 is then provided to check if a new NVOD is broadcast.

If the response is yes (line 23), recording (step 24) of the video beginning sequence is undertaken, when a tuner is available.

If the response is no, the test 22 is renewed.

FIG. 3 shows the Preliminary Recording Erasing.

After initiating program in 30, it is tested in 32 if no occurrence of the NVOD program is broadcast any longer.

If the response is yes (line 33), the preliminary record of the beginning of the program from the hard drive is erased in 34.

FIG. 4 shows the organigram of Just-In-Time Recording and Playing operation 12.

After initiation of the system in 40 the viewer selects the NVOD (step 42).

If a NVOD is selected (line 43), a step 44 of scheduling the start of Just-In-Time Recording is provided.

Then a step 46 scheduling the start of a playback display from Just-In-Time Record is provided, and the program starts the playback from the preliminary record (step 48).

If the viewer decides to quit (test 50) then the Just-In-Time record and Playback from Just-In-Time record are cancelled (step 52) before turning back to viewer selection in 42.

If the viewer does not want to quit, record trigger is tested in order to see if it has expired (test 54).

If not, then one should come back (line 56) to the test 50 on the viewer.

If the response is yes, a step of recording video from NVOD broadcast is started (step 58).

A test on the Playback trigger is then provided in 60, to check if the playback trigger has expired. If not, a test to check it the viewer has quitted is provided (step 62).

A step 64 of cancellation of the Playback trigger is then provided.

If the Playback trigger has expired, then there is a switch 66 from Playback to Just-In-Time Record, before testing in 68 if the viewer wants to quit or if the video program has reached an end.

Figure 5:
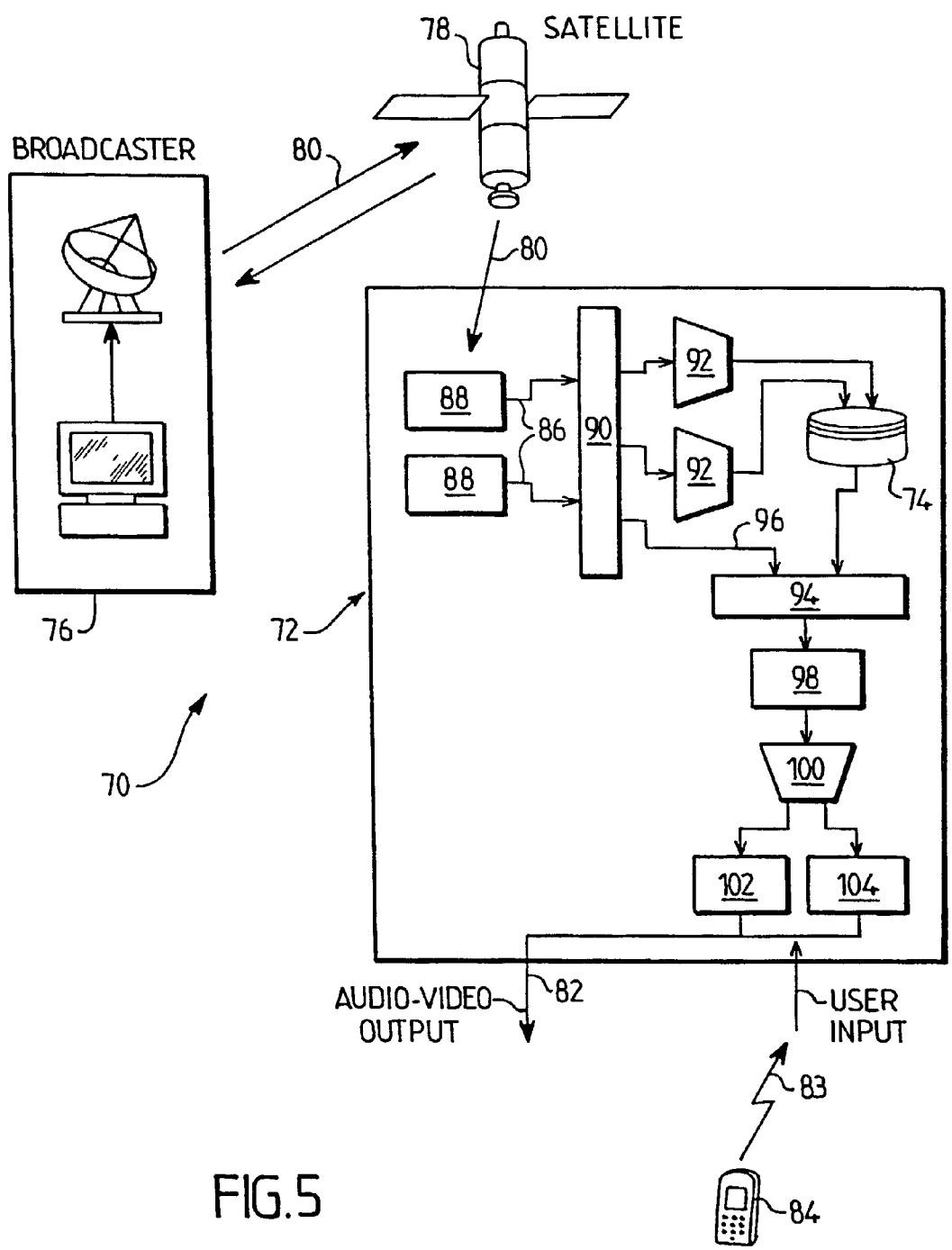
FIG. 5 is a schematic drawing showing the architecture of a system according to an embodiment of the invention 1.

FIG. 5 shows a system 70 including a receiver 72 integrating conditional access and an hard disk 74 whose registers are organised and programmed as mentioned in the invention.

A broadcaster 76 using, for instance, satellites 78 provides to the receiver 72 a signal 80 including NVOD programs.

The receiver 72 then provides the program 82 to a TV apparatus (not represented).

A user can act on the receiver 72 and select via IR Command 83 a program through a remote controller 84 in a manner known per se.

The signals 86 which comes from at least one Tuner/Demodulator 88 are provided to a switch matrix emitting said signals 86 either directly to a selecting circuit 94, through a full transport stream, or via demultiplexers 92 to the hard disk 74, for storage and Just-In-Time Record delayed release to the selecting circuit as according to the invention.

The selecting circuit 94 is connected to a descrambler 98, itself connected to a demultiplexer 100.

Said demultiplexer 100 provides signal to the video decoder 102 and to the audio decoder 104 which then delivers audio and video output 82 to the TV screen and apparatus.

Additional advantages and modifications will readily occur to those skilled in the art.

Therefore the present invention in its general aspects is not limited to the specific details, representative device and illustrated examples shown and described herein.

Furthermore, it also includes application to music plays and/or it concerns cables networks, and/or the decoder is programmed in a manner which is readily implementable by the man skilled in the art for conditional access and/or for implementing interactivity programs with the NVOD programs, for instance arranged to play with a delay.

The invention claimed is:

1. A process for displaying video programs on demand at the request of a user in a network system, said network system providing a plurality of near video on-demand ("NVOD") programs, each of said NVOD programs being started with a respective predetermined periodicity, said process comprising:

recording in advance a beginning sequence of each NVOD program from said network system, during a period of time at least equal to the corresponding time period of periodicity;

testing for a new NVOD program being broadcast, and initiating recording of a beginning sequence of the new NVOD program;

selecting a NVOD program from a menu;

displaying the beginning sequence of the selected NVOD program and while displaying the beginning sequence, recording a following sequence that follows the beginning sequence of said selected program from the NVOD network so that said following sequence of said selected program gets stored before the user reaches it;

displaying said following sequence in a continuation or partial overlap of said beginning sequence of the selected program;

and if needed, recording and then displaying subsequent following sequences of said selected program until the end of said selected program.

2. The process according to claim 1, wherein said period of time is a few minutes longer than the time period of periodicity of successive starts of the related program.

3. The process according to claim 1 wherein the NVOD programs are television broadcast programs.

4. The process according to claim 3 further comprising:

starting at a time t0 a preliminary recording of one of the plurality of NVOD programs, in a TV receiver, in synchronization with the start of a broadcast of said NVOD program;

ending said preliminary recording at a time t2 after the start at a time t1 of a following broadcast NVOD program, said preliminary recording being termed the beginning sequence;

selecting said NVOD program and displaying a Playback of the preliminary recording at a time t4 after the start at a time t3 of the currently running NVOD program wherein a time t4−t3 comprises a Playback Lag;

recording at a time t5 the currently running NVOD program as Just-In-Time Recorded Video;

switching from said beginning sequence to said Just-In-Time Recorded Video at a time t9, within a time period between t5 plus the Playback lag and t4+t2−t0;

displaying said Just-In-Time Recorded Video while continuing the recording of the currently running NVOD program;

ending said recording upon the occurrence of the end of the currently running NVOD program, and ending said displaying upon the occurrence of said end of Just-In-Time Recorded Video.

5. A process according to claim 4 wherein the currently running NVOD program is recorded in a sliding window.

6. A process according to claim 4 wherein the currently running NVOD program is recorded in successive registers.

7. A digital network system for displaying video programs on demand at the request of a user, including at least one digital Interactive Decoder, said system providing NVOD programs, each of said NVOD programs being started with a respective predetermined periodicity, to be received by said Decoder, wherein the digital network system comprises:

a recording unit for recording in advance a beginning sequence of each of said NVOD programs from said digital network system, during a period of time at least equal to the corresponding time period of periodicity;

a testing unit for testing for a new NVOD program being broadcast, and if it is then broadcasting initiating recording of a beginning sequence of the new NVOD program;

a selection unit for selecting a program from a menu;

displaying means for displaying the beginning sequence of the selected program;

a recording unit for recording the subsequent sequences of said selected program from the NVOD network so that at least one new sequence of said selected program gets stored before a user reaches it; and a display unit for enabling display of said new sequences in partial overlap of said beginning sequence or following portions of the selected program, until the end of said selected program.

8. A system according to claim 7 further comprising a hard drive configured to store video data and wherein the Decoder comprises a built-in application for implementing interactivity programs with NVOD programs.

9. A system according to claim 7 wherein the NVOD programs are television broadcast programs, and implemented in a DVB environment.

10. A system according to claim 7 further comprising conditional access means.

11. A system according to claim 7 wherein the Decoder comprises a built-in application for implementing interactivity programs with said NVOD programs, arranged to play with a delay.

12. A receiver for displaying video programs on demand at the request of a user in a network system, said network system providing a plurality of near video on-demand ("NVOD") programs, each of said NVOD programs being started with a respective predetermined periodicity, wherein said receiver comprises:

circuitry configured to record in advance a beginning sequence of each of said NVOD programs from said digital network system, during a period of time at least equal to the corresponding time period of periodicity;

circuitry configured to test for a new NVOD program being broadcast, and if it is then broadcasting initiating recording of a beginning sequence of the new NVOD program;

circuitry configured to enable selection of a program from a menu;

circuitry configured to enable display the beginning sequence of the selected program;

circuitry configured to record subsequent sequences of said selected program from the NVOD network so that at least one new sequence of said selected program gets stored before a user reaches it; and circuitry configured to enable display of said new sequences in partial overlap of said beginning sequence or following portions of the selected program, until the end of said selected program.

13. The receiver according to claim 12, further comprising a mass storage device for storing recorded video data.

14. The receiver according to claim 12, wherein the NVOD programs are television broadcast programs.

15. The receiver according to claim 12, further comprising conditional access means.

* * * * *